(12) United States Patent
Kakuda

(10) Patent No.: US 6,449,176 B1
(45) Date of Patent: Sep. 10, 2002

(54) SWITCHING POWER SUPPLY HAVING AN OPERATIONAL AMPLIFIER CONTROL CIRCUIT

(75) Inventor: Kiyotaka Kakuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/941,613

(22) Filed: Aug. 30, 2001

(30) Foreign Application Priority Data

Aug. 31, 2000 (JP) ........................................ 2000-264347

(51) Int. Cl.[7] ................................................ H02M 5/42
(52) U.S. Cl. ...................................................... 363/91
(58) Field of Search ............................. 363/91, 89, 127, 363/86, 90

(56) References Cited

U.S. PATENT DOCUMENTS 4,849,874 A * 7/1989 Buck et al. .................. 323/253
5,539,630 A * 7/1996 Pietkiewicz et al. ........ 363/132

OTHER PUBLICATIONS

Fisher, R. A. et al., "A 500 kHZ, 250 W DC–DC Converter with Multiple Outputs Controlled by Phase–Shifted PWM and Magnetic Amplifiers", GE Corporate Research and Development, HFPC May 1988 Proceedings, pp. 100–110, (1988).

Densi–Gijutsu, Electronic Technology, vol. 27, No. 2, pp. 76–85, Jan. 18, 1985.

* cited by examiner

Primary Examiner—Shawn Riley
(74) Attorney, Agent, or Firm—Finnegan, Henderson, Farabow, Garrett & Dunner, L.L.P.

(57) ABSTRACT

A switching power supply includes saturable reactors and an amplifier control circuit for reducing the differences of a reset amount of the magnetic flux due to the differences of the coercive forces of the saturable inductors. A reset time for the respective magnetic fluxes of the saturable inductors is made the same by controlling the respective products of the voltages applied to the saturable reactors by a time determined by the output voltage of the power supply.

10 Claims, 6 Drawing Sheets

SWITCHING POWER SUPPLY HAVING AN OPERATIONAL AMPLIFIER CONTROL CIRCUIT

CROSS REFERENCE TO RELATED APPLICATION

This application claims the benefit of Japanese Patent Application No. P2000-264347, filed on Aug. 31, 2000, the disclosure of which is expressly incorporated herein by reference in its entirety.

DESCRIPTION OF THE INVENTION

1. Field of the Invention

The invention relates to a switching power supply. More particularly, the invention relates to a switching power supply having a novel magnetic amplifier control circuit.

2. Description of the Related Art

In a conventional switching power supply, an output voltage generated at a secondary side of a transformer in the switching power supply is fed back to a primary side of the transformer in order to stabilize the output voltage of a pulse width-modulated (PWM) controller.

Typically a conventional switching power supply having multiple-outputs, e.g., 5 V, 10 V and so on, uses magnetic amplifiers for control to stabilize each of the output voltages. The magnetic amplifiers are suitable for independently stabilizing the output voltages of the multiple outputs, since each of the output voltages is controlled at the secondary side of the transformer.

FIG. 5 illustrates a conventional switching power supply controlled by a forward magnetic amplifier in which a transformer T2 having a primary side winding N0 and first and second secondary side windings N1 and N2 is provided.

An induced AC voltage at the first winding N1 passes though a rectifying diode D11, a fly-wheel diode D12 and a smoothing circuit comprised of a smoothing coil L11 and a smoothing condenser C11 in order to output a first DC output voltage $V_{01}$. The output first voltage $V_{01}$ is fed back to a transistor Q11 serially coupled to the winding N0 at the primary side of the transformer T1 for stabilizing the first output voltage $V_{01}$ by using a PWM controller 16.

An induced AC voltage at the second winding N2 passes through a rectifying diode D13, a fly-wheel diode D14, a smoothing coil L12 and a smoothing condenser C12 in order to provide a second DC output voltage $V_{02}$. In order to stabilize the second output voltage $V_{02}$ independently of the stabilization control for the first output voltage $V_{01}$, PWM control is performed by using a magnetic amplifier control circuit that includes a saturable inductor LS3.

The magnetic amplifier control circuit includes an operational amplifier OP4. The second output voltage $V_{02}$ is supplied to a plus (+) input terminal of the operational amplifier OP4 through a variable resistor R22. A reference voltage $V_{ref}$ generated at a Zener diode ZD1 is supplied to a minus (−) input terminal of the operational amplifier OP4 for comparison with the second output voltage $V_{02}$. By comparing these voltages, the operational amplifier OP4 supplies a control current Im to a conning point between the saturable inductor LS3 and the rectifying diode D13 through a resistor R23 and a diode D15. In FIG. 5, R21 is a current supplying resistance for the diode ZD1.

When the connecting point between the saturable inductor LS3 and the diode D13 has a negative potential, the control current Im flows toward the saturable inductor LS3 from the operational amplifier OP4 through the diode D15. In accordance with the magnitude of the control current Im, the magnetic fluxes of the saturable inductor LS3 are reset. When the magnetic fluxes have reset, the saturable inductor LS3 changes from a saturation state to a non-saturation state.

When the saturable inductor LS3 changes to the non-saturation state, the inductance of the saturable inductor LS3 becomes a large value. Consequently, even when a voltage E is supplied to the saturable inductor LS3 from the winding N2 in a forward direction at a next time after the saturable inductor LS3 has changed to a non-saturation state, the flow of control current Im is delayed by a time $\Delta T$ that corresponds to a reset amount $\Delta \Phi$ of the magnetic flux of the saturable inductor LS3. Here, the magnetic flux $\Delta \Phi$ is represented as a product of the voltage and the time, i.e., $\Delta T \times$voltage E. Consequently, the delayed time $\Delta T$ is obtained by the following equation:

$\Delta T = \Delta \Phi / E.$

Thus, it becomes possible to perform PWM control of the output voltage at the secondary side of the transformer T2 with the changing pulse width of the pulse current flowing through the second winding N2 of the transformer T2 by controlling the amount of the reset of the magnetic flux $\Delta \Phi$.

FIG. 6 illustrates a conventional push-pull magnetic amplifier type switching power supply. As illustrated in FIG. 6, a winding N0 is provided at the primary side of a transformer T1 and a plurality of windings N1–N4 are provided at the secondary side of the transformer T1. The winding N0 is coupled to two pairs of transistors F2 and F3, and F1 and F4. By alternately turning ON and OFF the pairs of the transistors F2 and F3, and F1 and F4, it becomes possible to alternately switch the positive and negative current flow through the winding N0 of the transformer T1. C0 is a condenser for preventing saturation of the transformer T1.

Induced AC voltages at the windings N3, N4 are full-wave rectified by a pair of rectifying diodes D21 and D22, and smoothed at a smoothing coil L21 and a smoothing condenser C21. Then a first DC voltage, e.g., 5 V, is outputted at a resistor R31. Further, the induced AC voltages at the windings N1, N2 are full-wave rectified by a pair of rectifying diodes D1 and D2 and smoothed by a smoothing coil L1 and a smoothing condenser C1. Then a second DC voltage, e.g., 10 V, is outputted at a resistor R42. Here, in order to stabilize the output voltage at the resistor R42, a magnetic amplifier control circuit performs PWM control by using saturable inductors LS1 and LS2.

In the magnetic amplifier control circuit, a transistor Q12 is coupled to the resistor R42 through a resistor R41 connected in parallel with the resistor R42. A control current Im outputted from the transistor Q12 is supplied to respective connecting points d1, d2 between each of the saturable inductors LS1, LS2 and each of the rectifying diodes D1, D2, through the respective diodes D3, D4. In FIG. 6, an ON/OFF control circuit for the transistor Q12, such as an operational amplifier, is not illustrated. Thus, stabilization of the output voltage is achieved by resetting the magnetic fluxes of the saturable inductors LS1, LS2 during a period when each of the connecting points d1, d2 has a negative potential, and the pulse current flows in the windings N1 and N2 for the duration of the pulse width.

In the push-pull magnetic amplifier type switching power supply, it is possible to achieve low noise of the switching power supply by using a phase shift full-bridge circuit comprised of the plurality of the transistors F1–F4 on the primary side of the transformer T1.

However, voltages VS1 and VS2 of the respective saturable inductors LS1, LS2 do not only depend upon the magnitude of the control current Im but also depend upon coercive forces Hc1 and Hc2 of the respective saturable inductors LS1, LS2. Consequently, if there are differences between the coercive forces Hc1 and Hc2 of the saturable inductors LS1, LS2, the ON widths of the respective currents that flow to the rectifying diodes D1 and D2 differ from each other even if the same current magnitude flows in both of the saturable inductors LS1, LS2.

Consequently, in a push-pull type switching power supply, the current balance during the push time and the pull time is destroyed, and the condenser CO is DC biased by the current difference. This causes a problem of unbalance of the product of voltage by time for the transformer between the push-time period and the pull-time period, and the transformer T1 is saturated.

Further, in a conventional magnetic amplifier control circuit, it is desirable to insert a common mode choke in order to reduce noise in the output voltages. However, in order to insert the common mode choke in output lines, it is necessary to separate the ground reference from the reference voltage Vref supplied from an outside circuit, Thus, conventionally, it has been difficult to insert the common mode choke in the output lines. Consequently, it has been difficult to reduce noise in the switching power supply.

Furthermore, the conventional switching power supply has another problem of insufficiency of stabilization of the output voltages by only controlling the reset amount of the saturable inductors based on the comparison between the output voltage and the reference voltage.

SUMMARY OF THE INVENTION

Therefore, it is desirable to provide a switching power supply that is not subject to the aforementioned problems and disadvantages of a conventional switching power supply.

In accordance with the purpose of the invention as embodied and broadly described, there is provided a switching power supply comprising: a saturable inductor serially coupled to a secondary side winding of a transformer; a smoothing circuit for smoothing an AC output of the secondary side winding of the transformer; an operational amplifier for comparing a DC output voltage from the smoothing circuit and a reference voltage; and a control voltage generating circuit for generating a control voltage of the saturable inductor based on a result of the comparison by the operational amplifier; wherein, a magnetic flux of the saturable inductor is reset in response to the control voltage from the control voltage generating circuit.

Furthermore, there is provided the invention provides a switching power supply, comprising: a saturable inductor serially coupled to secondary side windings of a transformer; a smoothing circuit for smoothing an AC output from the secondary side winding of the transformer; a common mode choke coupled between the smoothing circuit and output terminals of the switching power supply; a first operational amplifier for comparing a DC output voltage from the secondary side winding and a first reference voltage; a current sensor for detecting an output current from the secondary side winding; a second operational amplifier for comparing a voltage corresponding to a detected current by the current sensor and a second reference voltage; a photo-coupler for coupling the first operational amplifier and the second operational amplifier; and a control voltage generating circuit for generating a control voltage based on a result of the comparison by the second operational amplifier; wherein a magnetic flux of the saturable inductor is reset in response to the control voltage from the control voltage generating circuit.

Also in accordance wit the present invention, there is provided a method of operating a switching power supply, comprising: coupling a saturable inductor serially to a secondary side winding of a transformer; smoothing, with a smoothing circuit, an AC output of the secondary side winding of the transformer; comparing, with an operational amplifier, a DC output voltage from the smoothing circuit and a reference voltage; generating a control voltage based on a result of the comparison by the operational amplifier; and resetting a magnetic flux of the saturable inductor in response to the control voltage.

Additionally in accordance with the present invention, there is provided a method of operating a switching power supply, comprising: serially coupling a saturable inductor to a secondary side winding of a transformer; smoothing, with a smoothing circuit, an AC output from the secondary side winding of the transformer; coupling a common mode choke between the smoothing circuit and output terminals of the switching power supply; comparing, with a first operational amplifier, a DC output voltage from the smoothing circuit and a first reference voltage; detecting an output current from the secondary side winding; comparing, with a second operational amplifier, a voltage corresponding to the detected output current and a second reference voltage; coupling, with a photo-coupler, the first operational amplifier and the second operational amplifier; generating a control voltage based on a result of the comparison by the second operational amplifier; and resetting a magnetic flux of the saturable inductor in response to the control voltage.

Additional objects and advantages of the invention will be set forth in the description that follows, and in part will be obvious from that description, or may be learned by practicing the present invention. The objects and advantages of the invention may be realized and obtained by means of the instrumentalities and combinations particularly pointed out in the appended claims.

BRIEF DESCRIPTION OF THE DRAWINGS

A more complete appreciation of the present invention and many of the attendant advantages will be realized as the same becomes better understood by reference to the following detailed description when considered in connection with the accompanying drawings in which like reference numerals designate identical or corresponding parts throughout the several views.

DESCRIPTION OF THE PREFERRED EMBODIMENTS

Reference will now be made in detail to embodiments of the invention, examples of which are illustrated in the accompanying drawings. Wherever possible, the same reference numbers will be used throughout the drawings to refer to the same or like parts.

A switching power supply consistent with the invention includes a transformer T1 which has a primary side circuit and a secondary side circuit coupled to the respective primary and secondary windings. Since the primary side circuit of the switching power supply consistent with the invention is usable as the similar primary side circuit such as shown in the conventional switching power supply of FIGS. 5 or 6, FIGS. 1, 2 and 4 illustrate only main components of a secondary side circuit of a switching power supply consistent with the invention in order to simplify an explanation of features of the illustrated embodiments.

Figure 1:
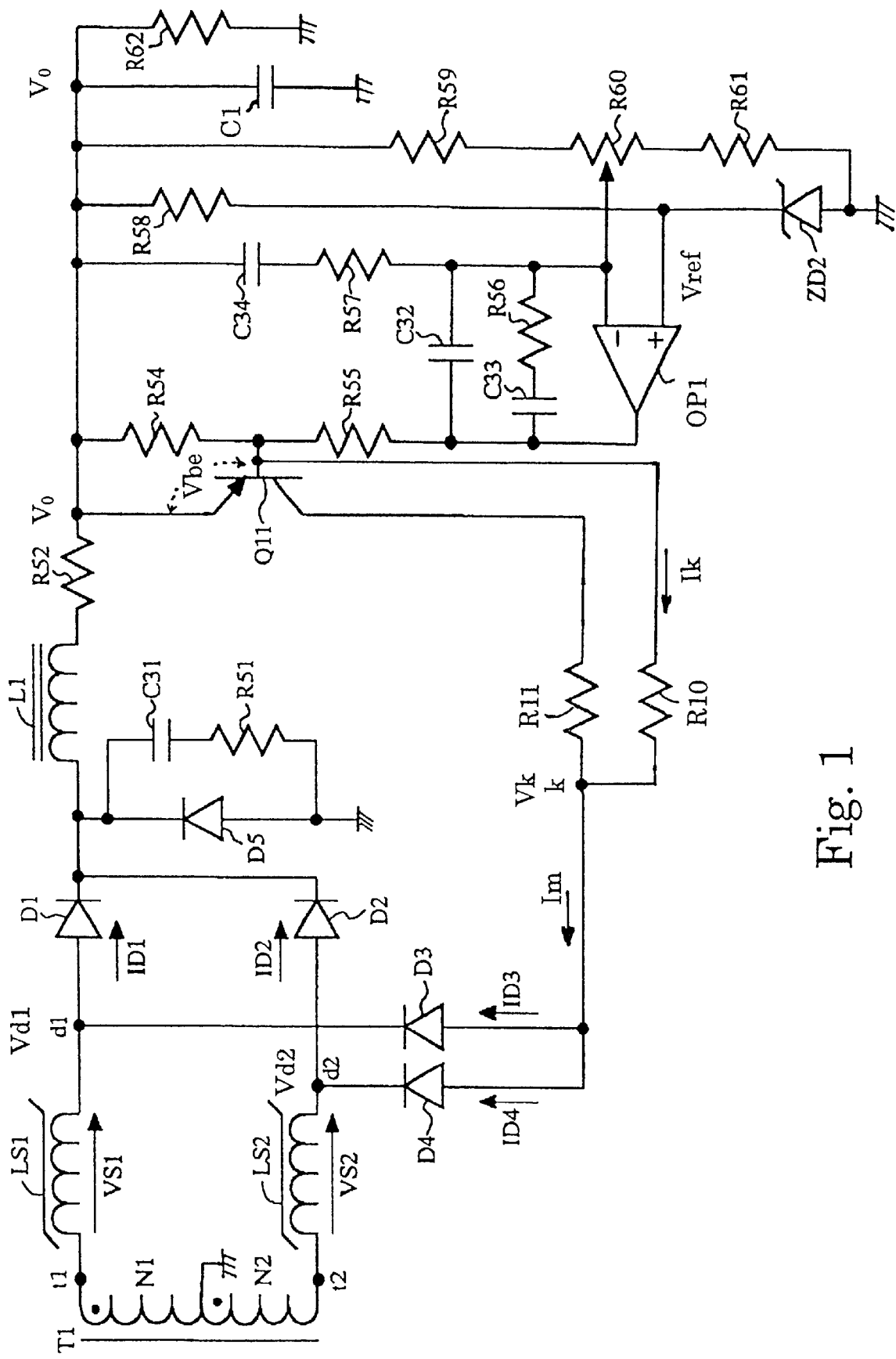
FIG. 1 is a circuit diagram illustrating a first embodiment of a switching power supply consistent with the invention.

Thus, as illustrated in FIG. 1, a secondary circuit for a switching power supply consistent with the invention comprises two saturable inductors LS1, LS2, respectively connected to taps t1 and t2 of secondary side windings N1, N2 of a transformer T1. The respective saturable inductors LS1, LS2 are connected to rectify diodes D1, D2 through respective connecting points d1, d2 for providing full wave rectification of the induced voltages on the windings N1, N2. The respective outputs of the rectifying diodes D1, D2 are commonly supplied to a smoothing circuit comprised of a smoothing coil L1 and a smoothing condenser C1 for outputting a DC output voltage $V_O$, at a resistor R62. At a front stage of the smoothing coil L1, a snubber circuit comprised of a capacitor C31 and a resistor R51 is provided in parallel to a commutation diode D5.

Further, the secondary circuit of the switching power supply includes a magnetic amplifier control circuit comprising an operational amplifier OP1 and a peripheral circuit for the operational amplifier OP1. The peripheral circuit includes a plurality of current supply resistors R54, R58, R59 and R61, a phase lead compensation circuit comprised of a condenser C34 and a resistor R57, and a phase delay compensation circuit comprised of a condenser C33, a resistor R56 and a condenser C32. As illustrated, the condenser C32 is connected in parallel with the condenser C33 and the resistor R56.

In order to perform stabilization, the output voltage $V_O$ is supplied to a minus (−) terminal of the operational amplifier OP1 through a variable resistor R60. A reference voltage Vref is supplied to a plus (+) terminal of the operational amplifier OP1 for comparison with the output voltage $V_O$ on the (−) terminal. The reference voltage Vref is generated at a Zener diode ZD2 connected to the resistor R58. An output terminal of the operational amplifier OP1 is coupled to the resistor 54 through a resistor R55 that is connected to a transistor Q11. An emitter terminal of the transistor Q11 is connected to the smoothing coil L1 through a resistor R52 for supplying the output voltage $V_O$. A base terminal of the transistor Q11 is connected to the output of the operational amplifier OP1 through the resistor R55.

The operational amplifier OP1 supplies an output signal to the base terminal of a transistor Q11 after comparing the output voltage $V_O$ and the reference voltage Vref. In accordance with a difference between the output voltage $V_O$ and the reference voltage Vref, the transistor Q11 outputs a control current Im from its collector. The collector of the transistor Q11 is coupled to the respective output connecting points d1, d2 of the saturable inductors LS1, LS2 through diodes D3, D4. Thus, the diodes D3, D4 are commonly coupled to the collector of the transistor Q11 through a resistor R11. Further, the collector of the transistor Q11 is coupled to the base terminal through a resistor R10 in order to feed back the control current Im to the base of the transistor Q11.

According to the construction, the control circuit can maintain the following relationship:

$$Vk=V0-Vbe-Vr=\text{constant}$$

Here, Vk is a potential at a connecting point k between the resistor R10 and the resistor R11, Vbe is a voltage between the base ad the emitter of the transistor Q11, and Vr is a voltage of the resistor R10. Consequently, it becomes possible to maintain the respective voltages VS1, VS2 of the saturable inductors LS1, LS2 at an equal value by controlling a current Ik flowing in the resistor R10 to be constant. Thus, it becomes possible to equally maintain the reset amounts for the respective saturable inductors LS1, LS2 even when the coercive forces Hc1, Hc2 of the saturable inductors LS1, LS2 are different from each other. Since the control current Im outputted from the transistor Q11 is supplied to the connecting points d1, d2 between the saturable inductors LS1, LS2 and the diodes D1, D2, the magnetic fluxes of the saturable inductors LS1, LS2 are reset by flowing the control current Im in the saturable inductors LS1, LS2 during a time when each of the connecting points d1, d2 is at a negative potential.

Operation of the secondary circuit is explained next. When a negative voltage is induced at the secondary winding N1 while the saturable inductor LS1 is in a low inductance state, a tap voltage at the connecting point t1 has a negative potential. Thus, a potential Vd1 at the connecting point d1 also has a negative potential to conform to the potential of the connecting point t1.

After comparison between the output voltage $V_O$ and the reference voltage Vref, a voltage corresponding to the comparison by the operational amplifier OP1 is supplied to the base of the transistor Q11 and the control current Im is outputted from the collector of the transistor Q11 in accordance with the difference between the output voltage $V_O$ and the reference voltage Vref.

The control current Im flows toward the diode D3 through the resistor 11. Thus, diode current ID3 that corresponds to the control current Im flows to the saturable inductor LS1 through the diode D3. As a result, a voltage VS1 is generated at the saturable inductor LS1. Consequently, the magnetic flux of the saturable inductor LS1 is reset in accordance with a product A of a voltage by a time:

$$\text{Product } A=VS1\times(T2-T1).$$

Here, (T2−T1) is an ON time of the current ID3 flowing in the saturable inductor LS1.

At a next time when the potential at connecting point t1 becomes positive, by inducing a positive voltage at the winding N1, a current ID1 is intended to flow from the connecting point t1 toward the saturable inductor LS1. However, since the flux of the saturable inductor LS1 is reset by the product A and the saturable inductor LS1 is in a non-saturation state, the current ID1 cannot immediately flow. The current ID1 begins to flow after a delay by a time Δt1 that corresponds to the product A in order to transition the saturable inductor LS1 into a saturation state. Thus, the current ID1 having a pulse width ton1 is outputted after the time Δt1 delay.

When a negative voltage is induced at the winding N2 and the potential at connecting point t2 becomes negative, the potential of the connecting point d2 becomes negative to conform to the potential at the connecting point t2. Similarly, the control current Im flows toward the diode D4 from the transistor Q11 in accordance, with the difference between the output voltage VO and the reference voltage Vref. Consequently, a voltage VS2 is generated at the saturable inductor LS2. Then, the magnetic flux of the saturable inductor LS2 is reset in accordance with a product B of voltage by time:

Product $B=VS2\times(T4-T3)$.

Here, (T4–T3) is an ON time of the current ID4 flowing in the saturable inductor LS2.

At a next time T5, when the potential at the connecting point t2 becomes positive, by inducing a positive voltage at the winding N2, a current ID2 is intended to flow from the connecting point t2 toward the saturable inductor LS2. However, since the flux of the saturable inductor LS2 is reset by the product B and the saturable inductor LS2 is in a non-saturation state, the current ID1 cannot immediately flow. The current ID2 begins to flow after a delay by a time Δt2 that corresponds to the product B in order to transition the saturable inductor LS1 into a saturation state. Thus, the current ID2 having a pulse width ton2 is outputted after the time Δt2 delay.

As explained above, a switching power supply having a magnetic amplifier control circuit consistent with the invention can control the respective ON widths ton1, ton2 of the diode currents ID1, ID2 by the products A, B of voltage by time, respectively. Thus, it becomes possible to stabilize the output voltage of the switching power supply in accordance with a load variation. Since the products A, B are determined based on the voltages VS1, VS2 of the saturable inductors LS1, LS2, and the voltages VS1, VS2 are based on the control current Im flowing in the saturable inductors LS1, LS2, it becomes possible to maintain the pulse widths ton1, ton2 of the currents ID1, ID2 at the same width by controlling the current value Im with the resistor R10.

Figure 2:
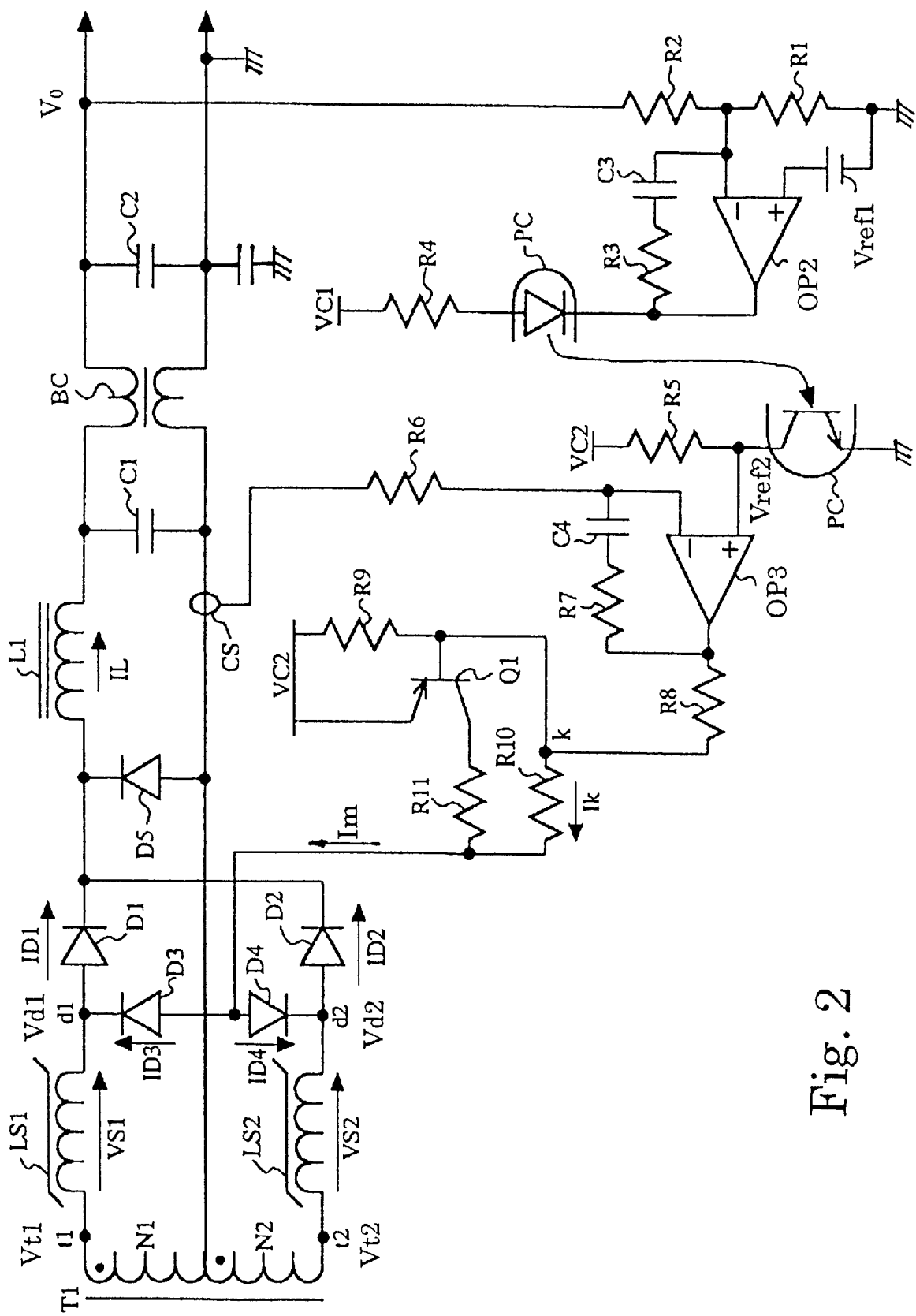
FIG. 2 is a circuit diagram illustrating a second embodiment of a switching power supply consistent with the invention.

FIG. 2 illustrates a second embodiment of a switching power supply consistent with the invention, The second embodiment is different from the first embodiment illustrated in FIG. 1 in that a common mode choke BC is inserted in the output lines of the windings N1, N2 for reducing noise, and a photo-coupler PC is coupled in the magnetic amplifier control circuit.

Similar to FIG. 1, the circuit illustrated in FIG. 2 also includes the transformer T1 having secondary side windings N1, N2, rectifying diodes D1, D2 for full wave rectifying induced AC voltages at the windings N1, N2 and a smoothing circuit comprised of smoothing coil L1 and smoothing condenser C1. The smoothed voltage is supplied to a condenser C2 through a common mode choke BC, and outputs a DC output voltage $V_O$. The output voltage $V_O$ is supplied to a minus (–) terminal of a first operational amplifier OP2 through a resistor R2. A reference voltage Vref 1 is supplied to a plus (+) terminal of the operational amplifier OP2 for comparison to the output voltage $V_O$.

The result of the comparison by the operational amplifier OP2 is supplied to a plus (+) terminal of a second operational amplifier OP3 through a photo-coupler PC. In FIG. 2, resistors R1, R4, and R5 are current supply resistors, a resistor R3 and a condenser C3 form a phase compensation circuit for the first operational amplifier OP2, and voltages VC1, VC2 are bias voltage supplies for the photo-coupler PC.

Since the common mode choke BC is inserted in the output lines of the windings N1, N2, the ground of the common mode choke BC is separated into a primary side and a secondary side. Thus, the ground of the magnetic amplifier control circuit is also separated. In order to keep the same ground, the photo-coupler PC is used. Thus, it becomes possible to electrically separate the ground level of the output voltage $V_O$ and the ground level of the magnetic amplifier control circuit by inputting an output of the first operational amplifier OP2 into the second operational amplifier OP3 through the photo-coupler PC. Consequently, even if the common mode choke BC is provided at a front stage of the output voltage $V_O$, it is possible to separate the ground references for reference voltages Vref 1, Vref 2 supplied to operational amplifiers OP2 and OP3. Thus, it becomes possible to reduce noises of the output voltage $V_O$.

On the other hand, an output inductor current IL is detected at a current sensor CS provided on one of the output lines of the windings N1, N2. The detected inductor current IL generates a voltage at a resistor R6 and the generated voltage is supplied to a (–) terminal of the second operational amplifier OP3. A reference voltage Vref 2 is supplied to a (+) terminal of the operational amplifier OP3 from the bias voltage VC2 and a resistor R5 under the control of the photo-coupler PC. Based on comparing both voltages at the second operational amplifier OP3, a resulting voltage is supplied to a base of the transistor Q1 through a resistor R8. The resistor R8 is connected to resistors R9, R10 and the base of the transistor Q1. A resistor R11 is connected to a collector of the transistor Q1. An emitter of the transistor Q1 and the resistor R9 are connected to the bias voltage VC2, A connecting point between the resistors R10 and R11 is connected to a connecting point between the diodes D3 and D4.

Consequently, a potential Vk at a connecting point k among the resistors R8, R9 and R10 can be maintained at a constant value. Thus, Vk=VC2–Vbe=constant. Here, Vbe is a voltage between the base and emitter of the trnsistor Q1. Consequently, the voltages VS1, VS2 of the saturable inductors LS1, LS2 become the same value by maintaining the current Ik flowing in the resistor R10 at a constant value. Thus, the constant current Ik can maintain the reset amounts of the saturable inductors LS1, LS2 to be the same, even if the coercive forces Hc1, Hc2 of the saturable inductors LS1, LS2 are different from each other.

Thus, the voltages VS1, VS2 of the saturable inductors LS1, LS2 are represented as follows:

$$VS1=Vt1+VC2-Vbe-R10\times Ik \quad (1)$$

$$VS2=Vt2+VC2-Vbe-R10\times Ik \quad (2)$$

Here, Vt1 is a potential at the connecting point t1, and Vt2 is a potential at the connecting point t2.

Consequently, the reset amounts of the saturable inductors LS1, LS2 can be controlled by controlling the current Ik, even when the coercive forces Hc1, Hc2 of the saturable inductors LS1, LS2 are different from each other, Further, the output inductor current IL detected by the current sensor CS is inputted to the second operational amplifier OP3 for comparing to a signal from the photo-coupler PC. Based on the comparison, the current Ik is controlled. Thus, it becomes possible to control the reset amount of the saturable inductors LS1, LS2 by a loop detecting the output inductor current IL through the current sensor CS. In comparison to directly controlling the reset amount of the saturable inductors LS1, LS2, it becomes possible to improve responsiveness to variation of the output voltage $V_O$ based on the result of the comparison between the output voltage $V_O$ and the reference voltage Vref 2.

FIGS. 3A–3G explain operations of the switching power supply control circuit of the second embodiment illustrated in FIG. 2.

Figure 3A:
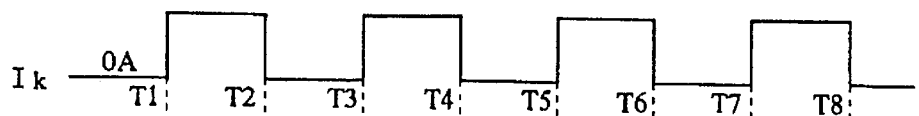
FIGS. 3A–3G illustrate the operations of the switching power supply illustrated in FIG. 2.
Figure 3B:
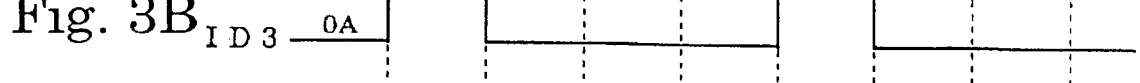
Figure 3C:
Figure 3D:
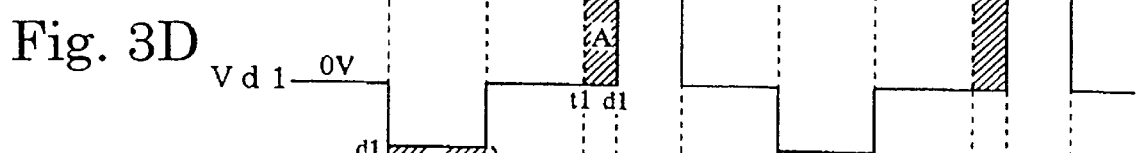

When a negative voltage is induced at the winding N1 at a time T1, and the potential at the connecting point t1 becomes negative, as illustrated in FIG. 3D, the electric potential Vd1 of connecting point d1 also becomes negative to coincide with the electric potential of the connecting point t1. As illustrated in FIG. 3A, the output voltage $V_O$ is supplied to the operational amplifier OP2 through the resistor R2 for comparison with the reference voltage Vref 1. The output signal from the operational amplifier OP2 is transferred through the photo-coupler PC and supplied to the (+) terminal of the operational amplifier OP3 as the reference voltage Vref 2. A voltage based on the output inductance current IL detected by the current sensor CS is supplied through the resistor R6 to the (−) terminal of the operational amplifier OP3. Thus, the operational amplifier OP3 outputs a control current in accordance with a voltage difference between the inputted voltages. Thus, the current Ik flows in the resistors R8 and R10 and controls conduction of the transistor Q1. The value of Ik is provided by:

Ik=Vbe/R9−Ip

Here, Vbe is a voltage between the base and the emitter of the transistor Q1, and Ip is the control current outputted by the operational amplifier OP3.

When the current Ik flows in the resistor R10, a combined current with the current in flows in the resistor R11 flows towards the diode D3. Thus, as illustrated in FIG. 3B, a current ID3 flows from the diode D3 to the saturable inductor LS1 through the connecting point d1. Consequently, a voltage VS1 is generated at the saturable inductor LS1. Thus, as illustrated in FIG. 3D, the magnetic flux of the saturable inductor LS1 is reset in accordance with the following product A of voltage by time:

$$A=VS1 \times (T2-T1)$$

Here, (T2−T1) is the ON time of the current ID3.

Thus, the control of the saturable inductor LS1 based on the product A is achieved by applying the voltage VS1 to the saturable inductor LS1. As shown in the equation (1), the voltage VS1 is maintained constant by a voltage determined by the current Ik. Accordingly, it becomes possible to control the reset amount of the magnetic flux of the saturable inductor LS1 by controlling the product A of voltage by time for the saturable inductor LS1 without dependence upon the coercive force Hc1 of the saturable inductor LS1.

Next, a positive voltage is induced at the winding N1 at a time T3 and the potential of the connecting point t1 becomes positive, Thus, the current ID1 intends to flow from the connecting point t1 to the saturable inductor LS1. However, since the saturable inductor LS1 has been reset by the product A of voltage by time and the saturable inductor LS1 is in a non-saturation state, the current ID1 cannot immediately flow. Thus, as illustrated in FIG. 3F, the current ID1 having a pulse width of ton1 begins to flow after a delay of time Δt1 corresponding to the product A of voltage by time, in order to move the saturable inductor LS1 into a saturation state.

Figure 3E:
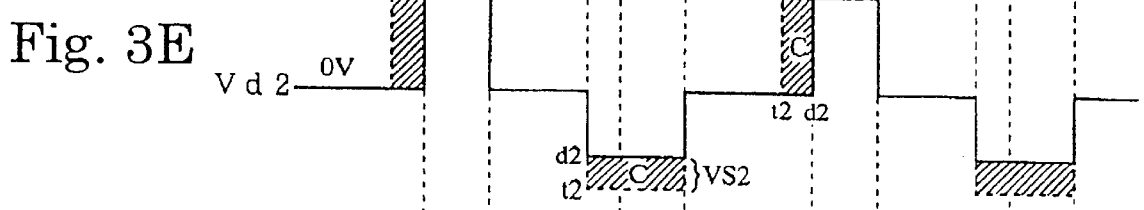
Figure 3F:

On the other hand, when a negative voltage is induced at the winding N2 and the potential of the connecting point t2 becomes negative at the same time T3, as illustrated in FIG. 3E, the electric potential Vd2 at the connecting point d2 also becomes a negative potential to coincide with the electric potential at the connecting point t2. Here, as illustrated in FIG. 3A, the current Ik flows in the resistor R10. Then, as illustrated in FIG. 3C, the current Ik flows toward the diode D4 side accompanying the current Im in the resistor R11, and a current ID4 flows from the diode D4 to the saturable inductor LS2 through the connecting point d2. Thus, a voltage VS2 is generated at the saturable inductor LS2, and as illustrated in FIG. 3E, the magnetic flux of the saturable inductor LS2 is reset corresponding to the following product B of voltage by time:

$$\text{Product } B=VS2 \times (T4-T3)$$

Here, (T4−T3) is the ON time of the current ID4.

When the coercive force Hc2 of the saturable inductor LS2 is smaller than the coercive force Hc1 of the saturable inductor LS1, and if the current ID3 in the saturable inductor LS1 is equal to the current ID4 in the saturable inductor LS2, the voltage VS2 of the saturable inductor LS2 becomes larger than the voltage VS1 of the saturable inductor LS1. Consequently, as illustrated in FIGS. 3D, 3E, the product B of the voltage by the time for the saturable inductor LS2 becomes larger than the product A of the voltage by the time for the saturable inductor LS1.

If the current Ik flowing during the period of T1–T2 in FIG. 3A is equal to the current Ik flowed during the period T3–T4, as shown in equations (1) and (2), the voltage VS1 of the saturable inductor LS1 becomes equal to the voltage VS2 of the saturable inductor LS2, even when the coercive force Hc2 of the saturable inductor LS2 is larger than the coercive force Hc1 of the saturable inductor LS1. Consequently, as illustrated in FIGS. 3D and 3E, the product A of the voltage by the time for the saturable inductor LS1 becomes equal to the product B of the voltage by the time for the saturable inductor LS2.

Figure 3G:
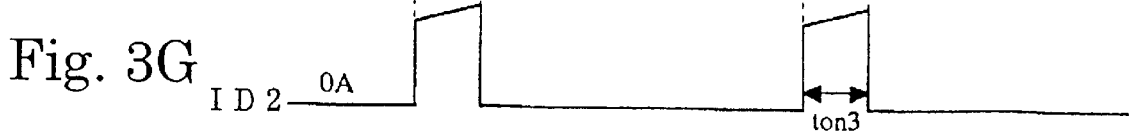

Next, at a time T5, a positive voltage is induced at the winding N2, and the connecting point t2 becomes a positive potential. Then, a current ID2 intends to flow from the connecting point t2 to the saturable inductor LS2. However, since the saturable inductor LS2 has been reset by the product B and the saturable inductor LS2 is in a non-saturation state, the current ID2 cannot immediately flow, and as illustrated in FIG. 3G, the current ID2 having a pulse width of ton3 begins to flow after a delay of time Δt3 that corresponds to the product B of the voltage by the time for moving the saturable inductor LS2 into a saturation state.

As explained above, according to embodiments consistent with the invention, it becomes possible to make the pulse widths ton1 and ton3 of the respective currents ID1 and ID2 equal, even when the coercive force Hc1 of the saturable inductor LS1 is different from the coercive force Hc2 of the saturable inductor LS2.

Figure 4:
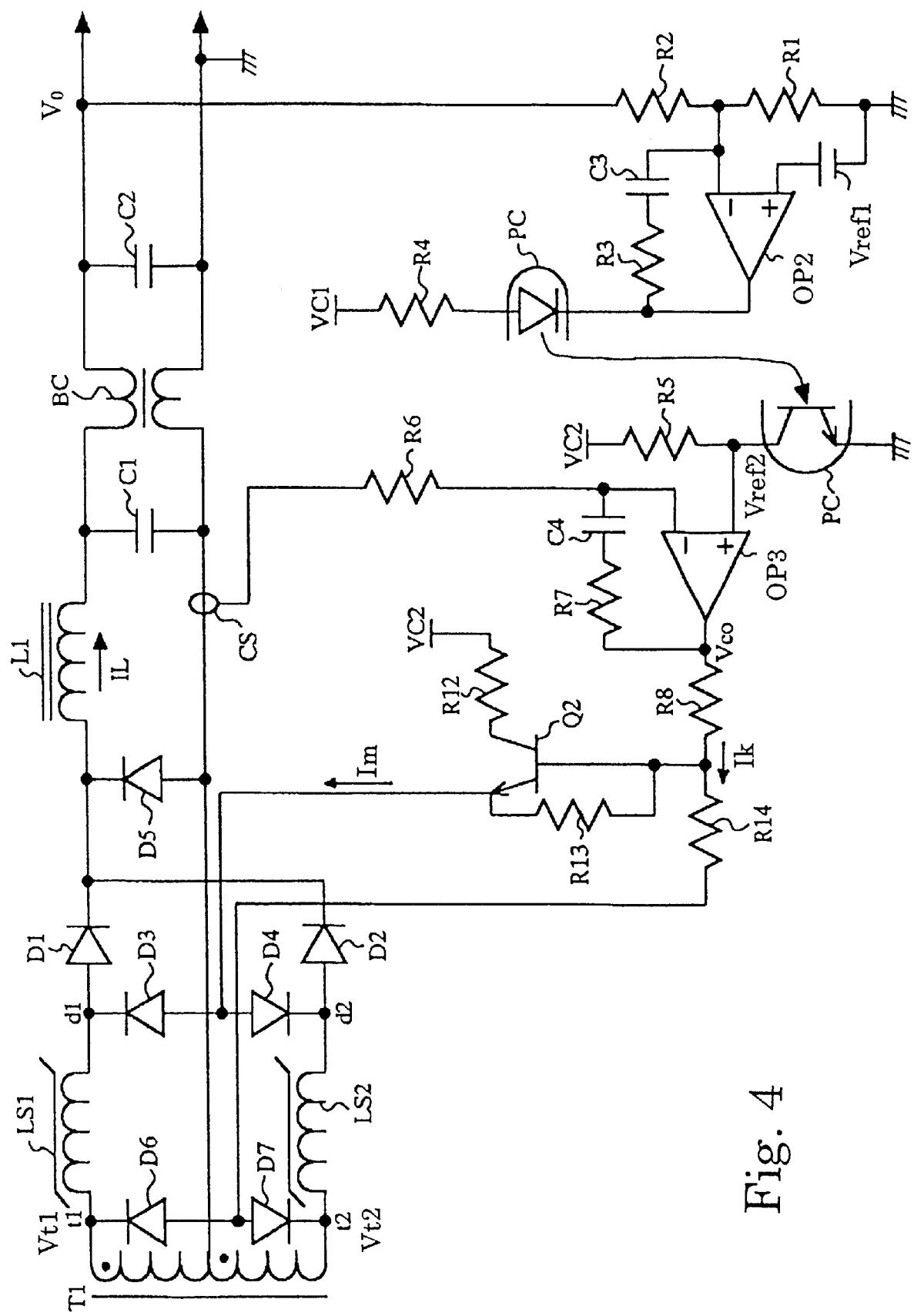
FIG. 4 is a circuit diagram illustrating a third embodiment of a switching power supply consistent with the invention.
Figure 5:
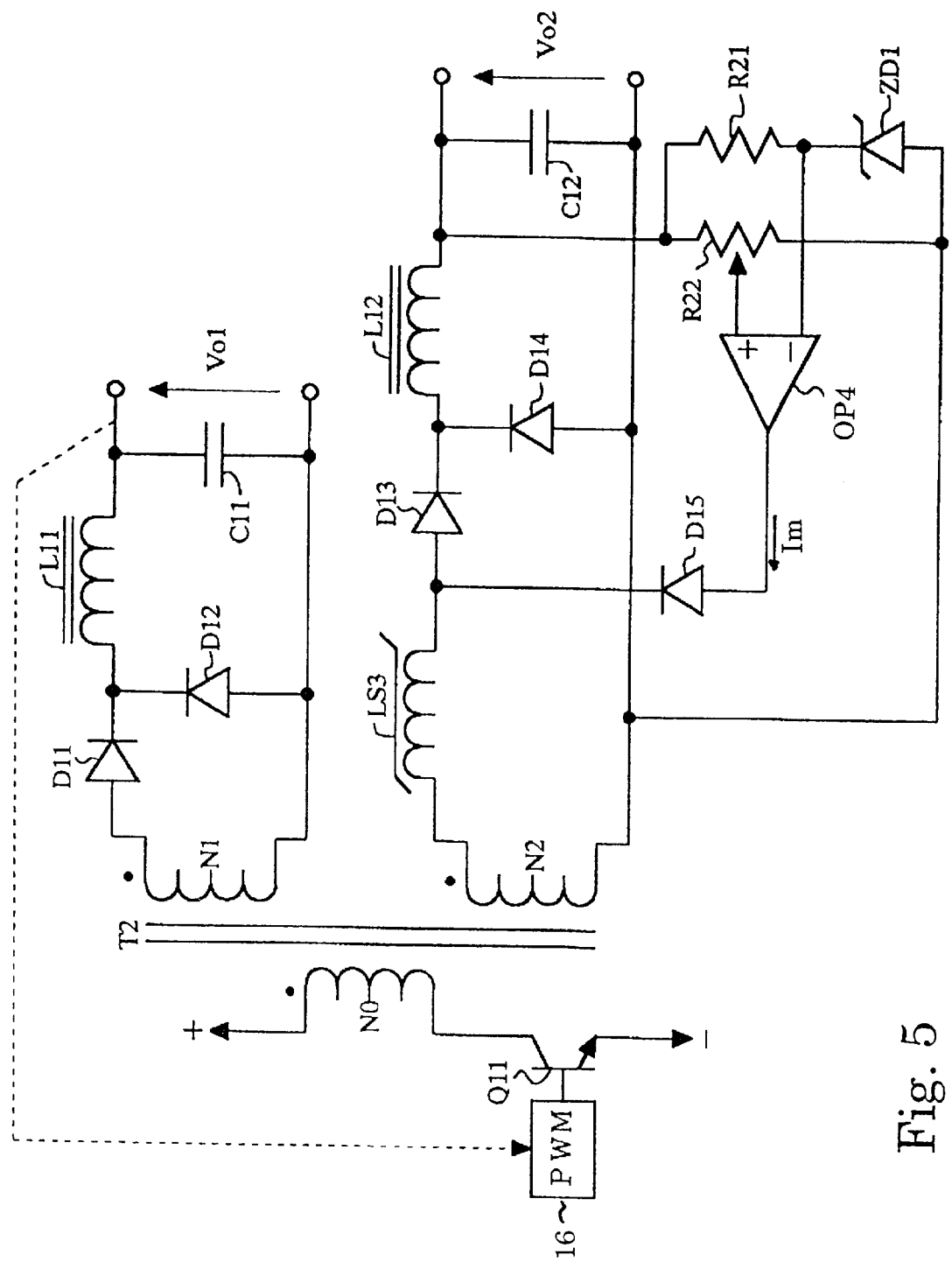
FIG. 5 is a circuit diagram illustrating a conventional forward magnetic amplifier type switching power supply.
Figure 6:
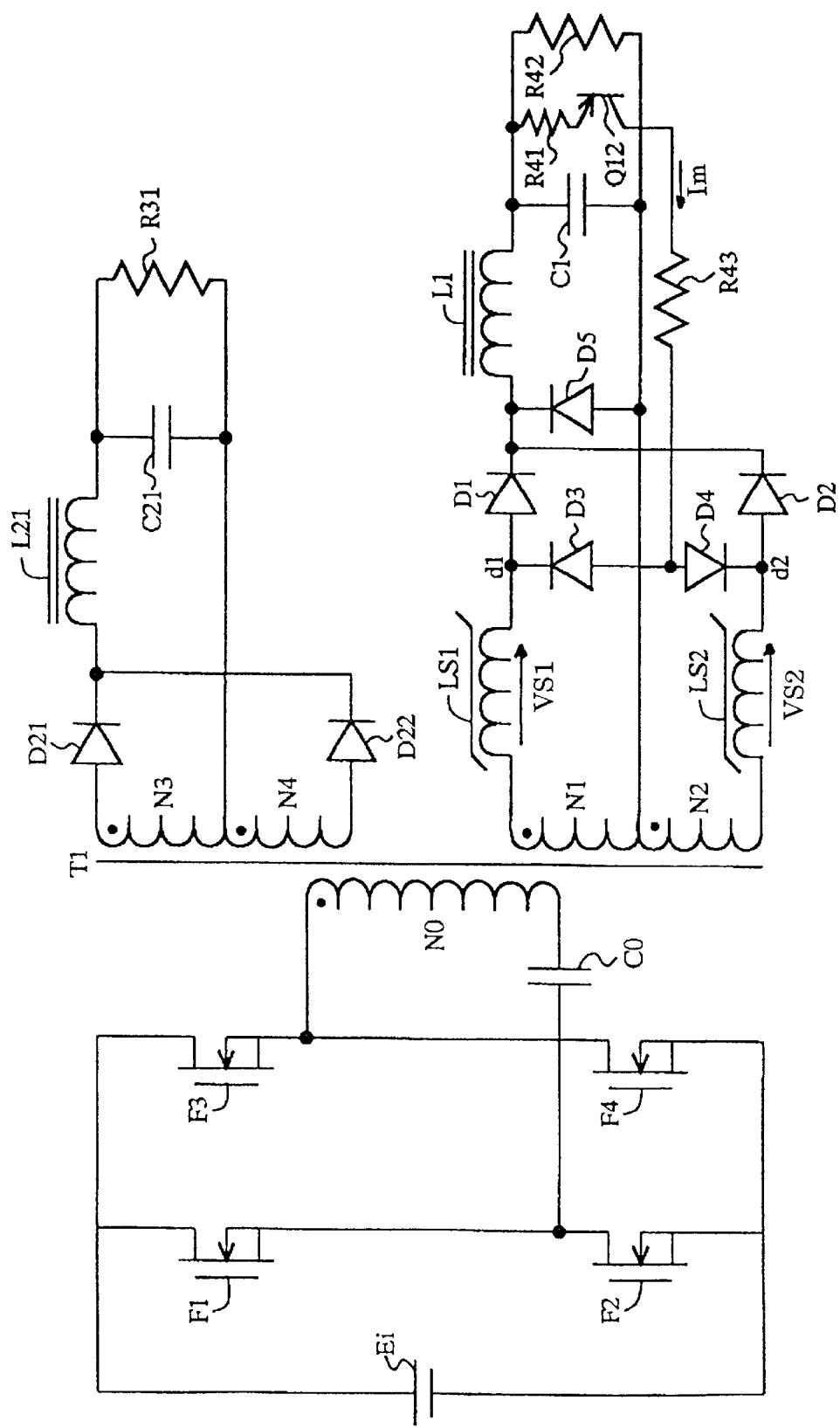
FIG. 6 is a circuit diagram illustrating a conventional push-pull magnetic amplifier type switching power supply.

FIG. 4 illustrates a third embodiment of a switching power supply control circuit consistent with the invention. In the second embodiment illustrated in FIG. 2, a PNP transistor Q1 is used. In contrast, in the third embodiment, an NPN transistor Q2 is used. Further, in the magnetic amplifier control circuit in the third embodiment, the transistor Q2 and resistors R12–R14 are provided in lieu of the transistor Q1 and resistors R9–R11 used in the second embodiment illustrated in FIG. 2. Furthermore, diodes D6, D7 are newly provided. The diodes D6 and D3 are respectively coupled to the input/output terminals t1, d1 of the saturable inductor LS1, and the diodes D7 and D4 are respectively coupled to the input/output terminals t2, d2 of the saturable inductor LS2. Further, the emitter of the transistor Q2 is coupled to a contact point between the diodes D3 and D4, and further coupled to the base of the transistor Q2 through the resistor R13. A bias voltage VC2 is supplied to the collector of the transistor Q2 through the resistor R12. Further, the resistor R8 is coupled to a connecting point between the diodes D6 and D7 through the resistor R14.

In accordance with the third embodiment, the respective voltages VS1 and VS2 for the saturable inductor LS1 and LS2 are given by the following equations, $$VS1 = R8 \times R14 \times ((Vt1+Vco)/R8 - Vbe \times (1/R13+1/R8+1/R14))/(R8+R14)$$

$$VS2 = R8 \times R14 \times ((Vt2+Vco)/R8 - Vbe \times (1/R13+1/R8+1/R14))/(R8+R14)$$

Here, Vbe is a voltage between the base and emitter of the transistor Q2, and Vco is an output voltage of the operational amplifier OP3.

Consequently, the reset amounts for the saturable inductors LS1 and LS2 are respectively controlled by the output voltage Vco of the operational amplifier OP3. Thus, it becomes possible to set equal the reset amounts for the saturable inductors LS1 and LS2, even when the coercive forces Hc1 and Hc2 for the saturable inductors LS1 and LS2 are different from each other.

As explained above, according to embodiments consistent with the invention, the reset amount for the saturable inductor is controlled by a voltage instead of by a current. Thus, the control by a voltage can reduce the differences of the reset amount of the magnetic flux due to the differences of the coercive forces of the saturable inductors.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

What is claimed is:

1. A switching power supply comprising:
   a saturable inductor serially coupled to a secondary side winding of a transformer;
   a smoothing circuit for smoothing an AC output of the secondary side winding of the transformer;
   an operational amplifier for comparing a DC output voltage from the smoothing circuit and a reference voltage; and
   a control voltage generating circuit for generating a control voltage of the saturable inductor based on a result of the comparison by the operational amplifier,
   wherein the control voltage generating circuit includes:
     a transistor, parallel coupled to output lines of the secondary side winding of the transformer, a base of the transistor being coupled to receive an output voltage from the operational amplifier;
     a diode connected between a collector of the transistor and an output terminal of the saturable inductor; and
     a resistor coupled between a collector of the transistor and the base of the transistor.

2. A switching power supply, comprising:
   a saturable inductor serially coupled to a secondary side winding of a transformer;
   a smoothing circuit for smoothing an AC output from the secondary side winding of the transformer;
   a common mode choke coupled between the smoothing circuit and output terminals of the switching power supply;
   a first operational amplifier for comparing a DC output voltage from the secondary side winding and a first reference voltage;
   a current sensor for detecting an output current from the secondary side winding;
   a second operational amplifier for comparing a voltage corresponding to a detected current by the current sensor and a second reference voltage;
   a photo-coupler for coupling the first operational amplifier and the second operational amplifier; and
   a control voltage generating circuit for generating a control voltage based on a result of the comparison by the second operational amplifier;
   wherein, a magnetic flux of the saturable inductor is reset in response to the control voltage from the control voltage generating circuit.

3. The switching power supply according to claim 2, wherein the control voltage generating circuit includes:
   a transistor coupled to a predetermined bias supply;
   a diode coupled between a collector of the transistor and an output terminal of the saturable inductor; and
   a resistor coupled between the collector and a base of the transistor,
   wherein, an output voltage from the second operational amplifier is supplied to the base of the transistor.

4. The switching power supply according to claim 2, wherein the control voltage generating circuit includes:
   a transistor coupled to a predetermined bias supply;
   a first diode coupled between a collector of the transistor and an output terminal of the saturable inductor;
   a first resistor and a second diode coupled between an output terminal of the second operational amplifier and an input terminal of the saturable inductor; and
   a second resistor coupled between an emitter and a base of the transistor,
   wherein, an output voltage of the second operational amplifier is supplied to the base of the transistor.

5. A switching power supply, comprising:
   a saturable inductor, serially coupled to a secondary side winding of a transformer;
   a smoothing circuit for smoothing an AC output from the secondary side winding of the transformer;
   a common mode choke coupled between the smoothing circuit and output terminals of the switching power supply;
   a first operational amplifier for comparing a DC output voltage from the smoothing circuit and a first reference voltage;
   a current sensor for detecting an output current from the secondary side windings;
   a second operational amplifier for comparing a voltage corresponding to the current detected by the current sensor and a second reference voltage;
   a photo-coupler for coupling the first operational amplifier and the second operational amplifier;
   a transistor including a base, a collector, and an emitter, an output control voltage from the second operational amplifier being supplied to the base of the transistor, and a predetermined bias supply being provided to the collector of the transistor;
   a first diode coupled between the emitter of the transistor and an output terminal of the saturable inductor;
   a first resistor and a second diode coupled between an output terminal of the second operational amplifier and an input terminal of the saturable inductor; and
   a second resistor coupled between the emitter and the base of the transistor.

6. A method for operating a switching power supply, comprising:

coupling a saturable inductor serially to a secondary side winding of a transformer;

smoothing, with a smoothing circuit, an AC output of the secondary side winding of the transformer;

comparing, with an operational amplifier, a DC output voltage from the smoothing circuit and a reference voltage;

generating a control voltage based on a result of the comparison by the operational amplifier; and resetting a magnetic flux of the saturable inductor in response to the control voltage;

wherein generating a control voltage includes:
coupling a transistor in parallel with output lines of the secondary side winding of the transformer such that a base of the transistor is coupled to receive an output voltage from the operational amplifier;

coupling a diode between a collector of the transistor and an output terminal of the saturable inductor; and coupling a resistor between the collector and the base of the transistor.

7. A method of operating a switching power supply, comprising:

serially coupling a saturable inductor to a secondary side winding of a transformer;

smoothing, with a smoothing circuit, an AC output from the secondary side winding of the transformer;

coupling a common mode choke between the smoothing circuit and output terminals of the switching power supply;

comparing, with a first operational amplifier, a DC output voltage from the smoothing circuit and a first reference voltage;

detecting an output current from the secondary side winding;

comparing, with a second operational amplifier, a voltage corresponding to the detected output current and a second reference voltage;

coupling, with a photo-coupler, the first operational amplifier and the second operational amplifier;

generating a control voltage based on a result of the comparison by the second operational amplifier; and resetting a magnetic flux of the saturable inductor in response to the control voltage.

8. The method of claim 7, wherein generating a control voltage includes:
coupling a transistor to a predetermined bias supply;
coupling a diode between a collector of the transistor and an output terminal of the saturable inductor;

coupling a resistor between the collector and a base of the transistor, and supplying an output voltage from the second operational amplifier to the base of the transistor.

9. The method claim 7, wherein generating a control voltage includes:
coupling a transistor to a predetermined bias supply;
coupling a first diode between a collector of the transistor and an output terminal of the saturable inductor;

coupling a first resistor and a second diode between an output terminal of the second operational amplifier and an input terminal of the saturable inductor;

coupling a second resistor between an emitter and a base of the transistor, and supplying an output voltage of the second operational amplifier to the base of the transistor.

10. A method of operating a switching power supply, comprising:

serially coupling a saturable inductor to a secondary side winding of a transformer;

smoothing, with a smoothing circuit, an AC output from the secondary side winding of the transformer;

coupling a common mode choke between the smoothing circuit and output terminals of the switching power supply;

comparing, with a first operational amplifier, a DC output voltage from the smoothing circuit and a first reference voltage;

detecting an output current from the secondary side winding;

comparing, with a second operational amplifier, a voltage corresponding to the detected output current and a second reference voltage;

coupling, with a photo-coupler, the first operational amplifier and the second operational amplifier;

supplying an output control voltage from the second operational amplifier to a base of a transistor, and providing a predetermined bias supply to a collector of the transistor;

coupling a first diode between an emitter of the transistor and an output terminal of the saturable inductor;

coupling a first resistor and a second diode between an output terminal of the second operational amplifier and an input terminal of the saturable inductor; and coupling a second resistor between the emitter and the base of the transistor.

* * * * *